Nov. 22, 1966  D. W. BATTEAU  3,286,782
ENERGY COUPLING DEVICE

Filed April 9, 1962  2 Sheets-Sheet 1

INVENTOR
DWIGHT W. BATTEAU

BY Kenway, Jenney + Hildreth
ATTORNEYS

Nov. 22, 1966   D. W. BATTEAU   3,286,782
ENERGY COUPLING DEVICE
Filed April 9, 1962   2 Sheets-Sheet 2

INVENTOR
DWIGHT W. BATTEAU
BY *Kenway, Jenney & Hildreth*
ATTORNEYS

United States Patent Office 3,286,782
Patented Nov. 22, 1966

3,286,782
ENERGY COUPLING DEVICE
Dwight W. Batteau, Cambridge, Mass., assignor to United Research Inc., Cambridge, Mass., a corporation of Massachusetts
Filed Apr. 9, 1962, Ser. No. 186,105
2 Claims. (Cl. 181—.5)

My invention relates to coupling devices used to couple time-varying energy of complex waveforms to a detector. More particularly, it relates to devices for coupling acoustic or electromagnetic energy incident on a detector to the system, using the detector to improve the intelligibility of the incident signal and to determine its direction and location.

The problem of coupling a detector to incident time-varying energy has been under study for decades. If only one component of information is desired, such as, for example, information as to the amplitude of the incident energy, the problem is relatively simple. A conventional microphone pickup will readily indicate the varying amplitudes of received sound energy. When greater information is desired the problem becomes more complex and has defied solution by relatively simple structures. Large scale specialized equipment has been built for certain particular applications. During the first World War, for example, listening devices were constructed for the orientation of weapons. These consisted of two spaced sound receiving devices. The signal from each receiving device was connected to one of the two ears of an operator. By listening with each ear to the signal from one receiving device the operator could orient the device in the surface of the sound wave front. This orientation defined a plane which included the source. Two operators, each using a pair of receivers could determine a single line perpendicular to the front, this line consisting of the two planes determined by the two devices. When the actual location of the source was required, the intersection of two lines directed to the point of origin was determined. This determination was made by utilizing two sites, each site including two listening devices, and each listening device having two pickups.

More recently studies have been undertaken which considered the human ears and their location on each side of the head. It is obvious that orientation of the two ears in the wave front gives some directional information. These studies indicated that a mental process was utilized to measure the time difference in arrival of the sound that reaches each of the ears. From this time difference in arrival, the direction of arrival is determined by a human listener through a mental operation. The idea of a phase difference, or difference in time of arrival between two ears has proved to be the popular hypothesis to explain how a human individual localizes a sound source. However, each determination provides only one orientation in a wave front. The required set of three lines to determine location can only be provided in a human by moving the head into at least three successive, different positions. Study of human observers has indicated that there is a tendency to move the head to locate a sound source. This tendency is particularly pronounced in the case of relatively steady sound sources.

Neither the gun director listening devices described above nor the studies of the human listening process have led to simple reliable devices for coupling to time varying energy sources such as sound waves. There exists a critical need for such devices in certain environments which preclude the presence of human ears at the detection point. Furthermore, there are certain applications, for example, devices for the hard of hearing, where large and bulky devices are totally unsuited.

Moreover, none of the previous devices provide any enhancement of the ability to distinguish a desired signal from background noise, except that improvement inherent in the extent to which the transducer may be directional in its pickup characteristics.

The present invention, accordingly, has an object of the provision of novel and effective coupling means suitable for providing information as to the location of the energy source.

Another object is to provide coupling means which increase the ability to distinguish desired signals from undesired signals or noise.

A further object is to provide coupling means which permit the determination of source direction with a single detector.

A still further object of the invention is to provide coupling means which permit the determination of source location with only two detectors. A still further object of my invention is the provision of coupling means which may be easily fabricated in small sizes.

These and other objects of my invention are achieved in a coupling in which the waves of incident energy impinge upon the signal detector or converter by travelling down paths of varying lengths from a given point or surface. Another feature of the invention is the provision of a plurality of paths of varying lengths from a receiving surface to a detection device. The invention likewise involves the several features and details of the couplers hereinafter described and illustrated in the accompanying drawings showing the invention in preferred embodiments.

Figure 2:
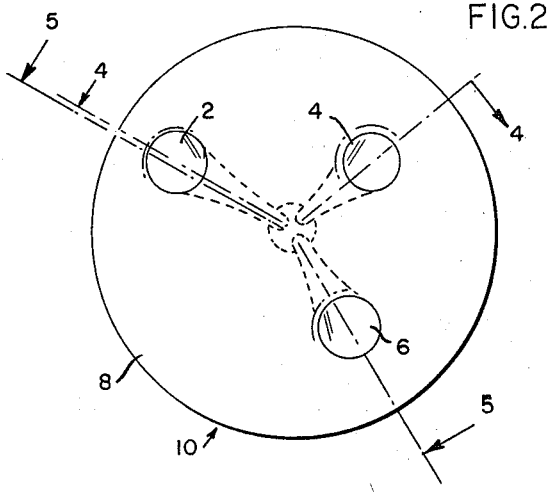
FIG. 2 is a front elevation view of the three hole coupler shown in FIG. 1.
Figure 3:
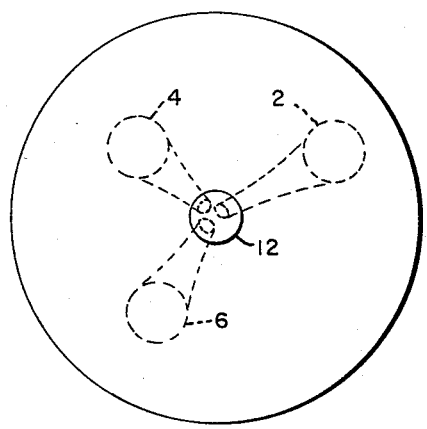
FIG. 3 is a rear elevation view of the three hole coupler shown in FIG. 1.
Figure 4:
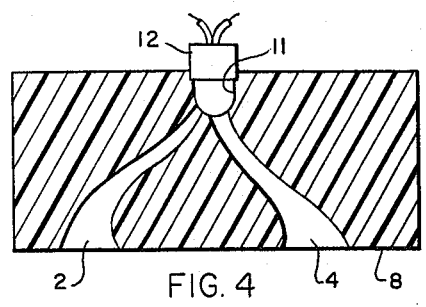
FIG. 4 is a cross section view along the line 4—4 of the three hole coupler shown in FIG. 2.
Figure 5:
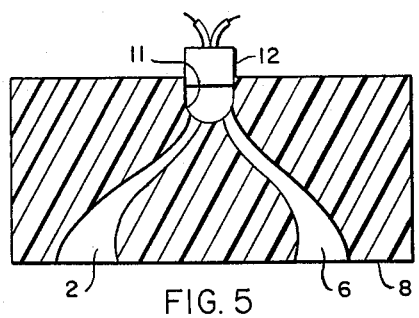
FIG. 5 is a cross section along line 5—5 of the three hole coupler shown in FIG. 2.

Referring now to FIGS. 1 to 5, a coupler with three openings is shown. The three openings or apertures 2, 4 and 6 are all located in surface 8 of coupler 10. A cavity 11 is provided for the insertion of a microphone 12 or other detector at the rear surface of the coupler. Cavity 11 is connected to each of the apertures 2, 4 and 6 through tubular channels 14, 16 and 18, respectively. As shown in FIGS. 4 and 5 each of these channels flares outwardly at its open end so that a relatively smooth transition is presented from the opening at the surface to the cavity for the detector.

Suitable dimensions for a coupler useful for coupling sound waves in air to a microphone are links of 1, 2 and 3 inches, respectively, for the paths 16, 14 and 18 in FIGS. 1 to 5. The apertures themselves may be approximately ⅜" in diameter. Aperture 4 may be approximately one inch from aperture 2 and approximately two inches from aperture 6. Suitable overall dimensions for a coupler with these path dimensions would be four inches in diameter and one inch in thickness. These dimensions may be varied substantially, but a substantial difference between the three path lengths must be maintained if effective localization and discrimination against undesired signals is to be maintained. Discrimination of sound signals in air is difficult with path lengths smaller than ½ inch. If the medium in which the incident energy is being transmitted is other than air, the dimensions would vary in direct proportion to the speed of the energy in that medium compared with the speed of sound in air. For example, consider the case of sound waves travelling in a medium wherein their speed was five times the speed of sound in air. In that case, the dimensions for a device corresponding to that just described in conjunction with FIGS. 1 to 5 would become 5, 10 and 15 inches, respectively, for the paths 16, 14, and 18.

Referring now to FIGS. 4 and 5, it will be seen as noted above that the transmission channels shown in cross section present smooth transitions from the apertures in surface 8 to the cavity 11 for the detector. In addition, the cavity 11 is proportioned to provide an efficient match to the termination of channels 14, 16 and 18. The cavity 11 itself is properly dimensioned to receive detector 12 and achieve an efficient acoustical coupling to the surface. In the case of incident sound energy being used, by way of example, the detector would normally consist of a microphone adapted to convert incident sound energy to electrical energy. As will be familiar to those skilled in the electrical arts, this can easily be accomplished by a microphone or capacitance in response to the incident energy or by a microphone which generates a signal voltage when energized by incident sound waves. When it is desired to use a coupler according to my invention with other than sound energy, the conventional detector appropriate for producing an output signal in response to incident energy of the type under consideration may be utilized.

The body of the coupler in which the channels for the transmission of energy are formed may be of any easily fabricated material. In general, rubber and rubber-like plastics are particularly suitable materials. Such materials can be easily molded to provide the desired paths and cavity for reception of the detection device. I have found that a silicone rubber is suitable. For example, a Dow Corning silicone rubber sold under the tradename Silastic RTV-502 was found to mix easily and produce a relatively void-free structure even when the amount of the catalyst used was sufficient to reduce the curing time from five to ten minutes. The particular curing time chosen will normally represent a comprise between a short curing time to reduce the production cycle to a minimum and sufficient pre-set flow to eliminate voids within the coupler. Other suitable silicone rubbers are commercially available. For example, General Electric markets a suitable material under the designation RTV-60. The RTV-60 produces a coupler of greater tensile strength and tear resistance but there is an increased likelihood that voids will be present. While minor voids are not particularly troublesome, the voids should not be sufficiently large that the channels become interconnected before they reach the cavity for the detector. Even minor voids are undesirable in any appreciable quantity since they will result in energy absorption as the incident energy travels down the various paths to the cavity containing the detector. To assure a perfect fit with the detector, a model of the detector which it is planned to use with the coupler can be utilized to form part of the mold for the cavity 11.

Figure 6:
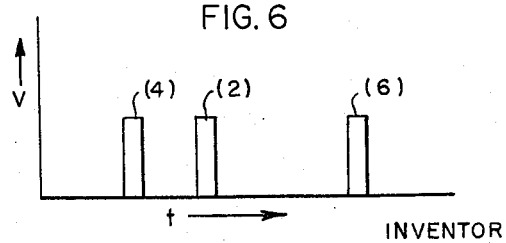
FIG. 6 is a graph showing voltage produced by a detector associated with the coupler of FIG. 1 when a signal arrives at the coupler.

FIG. 6 represents the signal arriving at the microphone or other transducer 12 when a single signal pulse is incident on the coupler surface 8. The voltage V produced by the microphone is plotted against time $t$. It will be seen that the energy passing through the shorter path 4 arrives first followed by the pulse passing through the path 2 and followed finally by that passing through the longest path 6. Thus, a single signal pulse is received as three pulses spaced in time. In the more normal case, as for example if speech was received, the original signal would be some form of complex wave form, but the resulting output from the microphone would still be the sum of three images of that wave form, each image being displaced in time with respect to each other.

Figure 1:
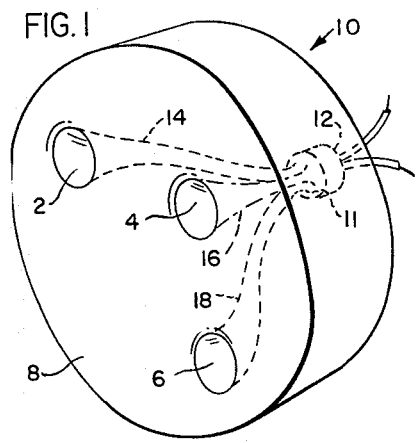
FIG. 1 is a perspective view of a three hole coupler constructed according to the present invention.
Figure 7:
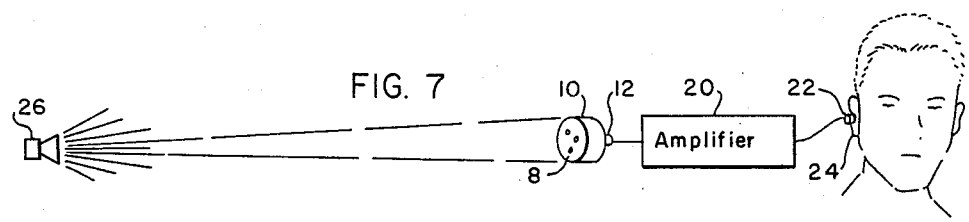
FIG. 7 is a schematic view of a detection system incorporating a coupler according to the present invention.

Referring now to FIG. 7, a system incorporating a coupler of the type shown in FIGS. 1, 2 and 3 is illustrated. The coupler 10 feeds microphone 12 whose output serves as an input to amplifier 20. The output from the amplifier 20 is fed to a headphone 22 inserted in the ear 24 of a human subject. If a signal in the form of a complex wave form from a source 26 arrives at coupler 10, the coupler will supply three related images of this waveform to the microphone 12. The amplifier 20 drives the earphone speaker 22 in accordance with these three related signals. Thus, the ear 24 will receive not a single sound wave form but rather the sum of three displaced wave forms as was discussed above in conjunction with FIG. 6. The mind of the user is believed to perform a correlation operation upon the information received. It has been found by experiment that it is possible using the arrangement shown to distinguish a desired signal from undesired background noise.

In addition, with the single coupler having three holes, as shown in FIGS. 1, 2 and 3, it is possible to get unambiguous information as to the direction of the sound source. This result is noteworthy since directional information is being obtained with a single ear. Thus, an individual with only one good ear can obtain directional information if that ear is supplied with complex signals which pass through a coupler according to the present invention. While maximum performance is achieved only with complex signals, the signals most often encountered in practice are of a complex nature and pure sinusoidal signals are seldom involved. Although three holes are preferable, it has been found that some directional capability is obtained with the system of FIG. 7 when a two-hole coupler is utilized. However, with a two-hole coupler there are lines of ambiguity in the direction information.

Figure 8:
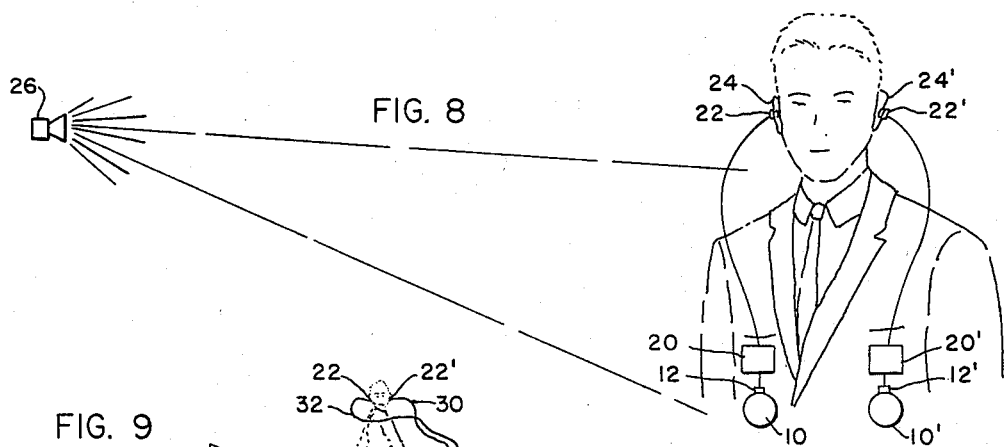
FIG. 8 is a schematic view of a detection system according to the present invention incorporating two couplers.

In the system of FIG. 8 two couplers are utilized for binaural operation. Couplers 10 and 10' feed microphones 12 and 12'. The outputs from these microphones are fed to the amplifiers 20 and 20', respectively. In turn, these amplifiers feed speakers 22 and 22' in the ears 24 and 24' of the subject.

Now assume that a complex sound wave form is provided from source 26. Previous theory and human experience with two ears has indicated that this sound can be distinguished from background noise, and that its position may be located. However, previously it has been necessary to move the head so that the sound is considered with the head in at least three independent positions. With the normal individual, this movement takes place unconsciously and automatically. I have found that with my invention the signal can be distinguished from background noise and other undesired signals and the location of the desired signal can be determined while the head remains in one position. Discrimination with respect to noise is improved because correlation can be performed upon the several sound images received through each of the coupling systems.

Furthermore, since each ear is provided with a system enabling it to perform a direction locating function, the two systems combined enable the location of the source to be determined. Thus, a person with hearing difficulties but some capability in each ear can be provided with the system of FIG. 7 enabling him to not only get the amplitude information normally received through a hearing aid, but also to receive information as to the location of the surrounding sound sources.

The distance that the apertures are separated on the surface 8 of the coupler is of importance primarily as it affects the precision required in the reception and correlation equipment. For example, the two inch separation between apertures 4 and 6 represents a distance which it will take sound in air at sea level travelling 1040 feet per second about 160 microseconds to traverse. Assume now that the surface 8 of the coupler 10 in FIG. 7 is so oriented that apertures 4 and 6 are in a direct line away from the source 26, such that the sound reaches aperture 6 160 microseconds before it reaches aperture 4. Now assume that the coupler 10 is rotated 180° so that sound reaches aperture 4 first. The sound will now reach aperture 6 120 microseconds later than it reaches aperture 4. The difference in time that sound reaches aperture 6 with respect to aperture 4 is thus twice the time it takes sound to travel from aperture 6 to aperture 4. In the example being considered, this would be a time difference of 320 microseconds. In other words, 320 microseconds corresponds to an angular rotation of 180°. If the dimensions suggested earlier are used for the separation of apertures 2 and 4, that is a one inch separation, then the time difference corresponding to 180° rotation for the line containing those two apertures would be one-half as much or 160 microseconds. Normally, the time corresponding to a rotation of 180° for the coupler as a whole will lie between these two extremes. Thus, one might say that an average value of 240 microseconds corresponds to an angular rotation of 180°. While the correspondence as to angular resolution in terms of the rotational angle is involved, determination of fractional rotation will require a corresponding ability to resolve approximately the same fraction in time. In other words, an ability to resolve 5° out of 180° would require an ability to resolve 5/180×240 or about 7 microseconds in time. Thus, a relatively high fidelity transmission and receiving system is required for high angular resolution. The enhancement of the ability to distinguish the desired signal from undesired signals and background noise is similarly related to both the structural dimensions and the performance of the transmission and reception equipment.

Figure 9:
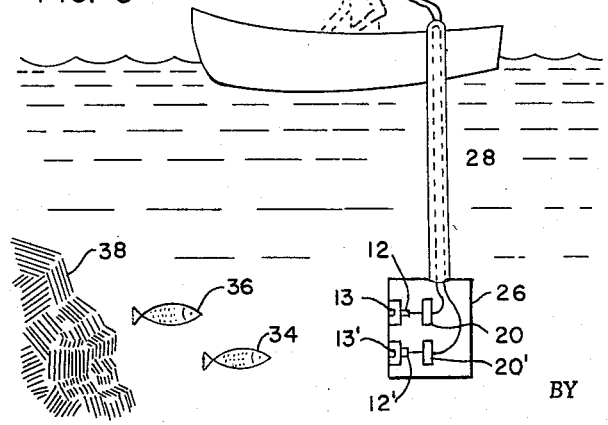
FIG. 9 is a schematic view of an underwater detection system.

In some applications, it is desirable that the detection apparatus be placed at locations unsuited for a human observer. For example, it may be desirable to listen to the various sounds produced by fish in a small underwater cave. With a single coupler constructed according to my invention, signals can be transmitted to an observer which will enable the various received sounds to be separated from the background noise and their directions located. With two couplers, the ability to discriminate against undesired signals is enhanced. In addition, with the two couplers system the locations of the various sources in space can be determined. Such a system is shown in simplified form in FIG. 9. Two couplers 13 and 13' are connected to microphones 12 and 12' feeding the two amplifiers 20 and 20', respectively. These couplers, the microphones and the amplifiers may be contained within an hermetically sealed box 26. A waterproof cable 28 contains wires 30 and 32. These wires carry the electrical signal to the earphone speakers 22' and 22, respectively. With this system, the operator located above the water in the boat can separate the sounds fish 34 and 36 make from the rest of the noises produced in the vicinity of the underwater sensing apparatus. In addition, he can determine the three-dimensional location of the fish within the water. Furthermore, so long as there are sources of sound such as the fish he can determine the location of the underwater rock 38 as the source of reflected sound emanating from that location.

It will be apparent that if underwater sensing is to be undertaken, or if sensing is to be done in environments other than the normal atmosphere, the coupler should be constructed of material appropriate to withstand the environment. As noted above, it should be designed to have path lengths producing delays appropriate to the speed of the signal in the environment. Fortunately, the materials which are suitable for the couplers, such as rubber and plastics, are materials which may be fabricated into devices resistant to most environmental conditions. Since the operator can be remote, he can be isolated from many of the hazards associated with the detection location.

Figure 10:
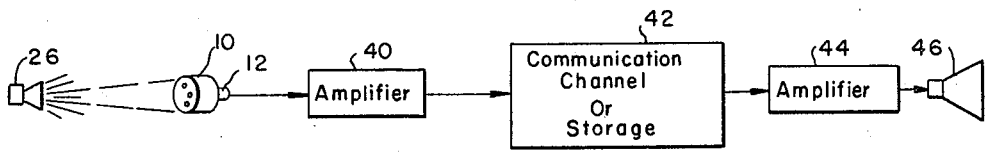
FIG. 10 is a schematic diagram of a coupler used in a sound communication system to enhance intelligibility.

Another application for the coupler of my invention is illustrated in FIG. 10. As shown therein, a coupler 10 such as that illustrated in FIGS. 1, 2 and 3 and a microphone 12 are provided, the output signal from the microphone being connected to an audio amplifier 40. The audio amplifier then supplies the amplified signal to a storage medium (magnetic tape, record or the like) or to a communication channel such as a radio or wire link where it is used as the modulating signal in any conventional fashion. For convenience, I will refer herein to both storage media, and communication links as a "communication channel." The audio signal, after passing through the communication channel 42 is recovered, amplified in amplifier 44 and reproduced as by sound reproducer 46.

In this use directional information is not necessarily desired, but what is sought is improvement in the signal-to-noise ratio of the signal supplied to the communications channel. Thus, it has been found that if one attempts to record dictation in a noisy environment for later transcription, the transcription operator sometimes cannot hear the recorded dictation over the background noise. However, if a coupler made according to my invention is utilized in conjunction with the microphone associated with the dictating machine, a substantial improvement in intelligibility of the recorded signal is obtained and the operator can transcribe the signal without difficulty.

Although the coupler has been discussed above in conjunction with acoustical systems, its utility is not limited to apparatus responsive to signals in the audio frequency. With appropriate pickup devices at the common terminal of the detection paths of the coupler, apparatus according to my invention is suitable for use in sonar systems or with systems responsive to electromagnetic radiation such as radar. In all cases, an enhanced ability to separate the desired signal is provided, and an ability to determine direction and source location can be provided with a minimum of equipment.

While the coupler embodiments have been shown as a basically cylindrical section with three paths within the section, the external shape can be varied to suit the associated equipment. Similarly, the apertures need not terminate in a single flat plane.

The specific couplers and systems shown have been shown for purposes of illustration only. Those skilled in the acoustic and electric arts will recognize that modifications in both the coupler and the overall coupling systems can be made without departing from the scope of my invention.

Having thus described my invention, I claim:

1. An omnidirectional acoustic coupler for coupling a source of sound energy to a detector, said coupler comprising a three-dimensional body of rubberlike material having at least one substantially planar surface, means forming a cavity in said body other than in said surface, said cavity being open at one end thereof and being adapted to receive a detector therein, at least three apertures formed in said planar surface, at least one of said three apertures lying outside a straight line connecting the other two of said apertures, tubular channels formed in said body connecting each of said apertures with said cavity, said channels progressively decreasing in diameter from said apertures to said cavity, each of said channels differing in length by a substantial amount whereby a plurality of images of a sound signal impinging on said planar surface are received by said detector.

2. The combination defined in claim 1 in which the longest channel of said three channels is at least one inch longer than the shortest of said channels, and the next to longest channel is at least one half inch longer than the shortest of said channels.

References Cited by the Examiner

UNITED STATES PATENTS

| | | | |
|---|---|---|---|
| 1,682,706 | 8/1928 | Mason | 181—.5 X |
| 2,172,871 | 9/1939 | Giannini | 181—26 |
| 2,228,886 | 1/1941 | Olson | 181—26 X |
| 2,468,042 | 4/1949 | Cranberg | 340—16 |
| 2,783,312 | 2/1957 | Mouzon | 340—16 X |
| 2,804,932 | 9/1957 | Bedard | 181—23 |
| 2,966,657 | 12/1960 | Price | 181—26 X |

RICHARD B. WILKINSON, *Primary Examiner.*

STEPHEN J. TOMSKY, *Examiner.*